US007948658B2

(12) United States Patent  (10) Patent No.: US 7,948,658 B2
Conrow et al.  (45) Date of Patent: May 24, 2011

(54) TONE REPRODUCTION CURVE LINEARIZATION

(75) Inventors: Brian R. Conrow, Webster, NY (US); Patricia J. Donaldson, Pittsford, NY (US); Fan Shi, Penfield, NY (US); William B. Willard, Fairport, NY (US); David C. Craig, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 416 days.

(21) Appl. No.: 12/127,221

(22) Filed: May 27, 2008

(65) Prior Publication Data

US 2009/0296175 A1  Dec. 3, 2009

(51) Int. Cl.
*G06K 15/00* (2006.01)
*G06K 9/00* (2006.01)
*H04N 1/60* (2006.01)
*H04N 1/46* (2006.01)
*G03F 3/08* (2006.01)

(52) U.S. Cl. ........ 358/3.06; 358/1.9; 358/504; 358/518; 382/162; 382/167

(58) Field of Classification Search ................. 358/3.06, 358/1.9, 504, 1.1, 1.4, 1.14, 3.01, 3.03, 3.07, 358/3.2, 519, 501, 518, 521, 3.26, 533; 382/162, 382/167, 237, 269
See application file for complete search history.

(56) References Cited

U.S. PATENT DOCUMENTS

| 5,543,935 | A | 8/1996 | Harrington |
| 5,625,716 | A | 4/1997 | Borg |
| 5,963,244 | A | 10/1999 | Mestha et al. |
| 6,384,918 | B1 | 5/2002 | Hubble, III et al. |
| 6,512,597 | B1 | 1/2003 | Cooper et al. |
| 6,624,911 | B1 | 9/2003 | Cooper et al. |
| 6,775,029 | B1 * | 8/2004 | Wen et al. ...................... 358/1.9 |
| 7,158,263 | B2 | 1/2007 | Allen et al. |
| 7,190,490 | B2 | 3/2007 | Cooper et al. |
| 7,272,333 | B2 | 9/2007 | Mizes |
| 2007/0196124 | A1 | 8/2007 | Thayer |
| 2007/0273900 | A1 | 11/2007 | Bai |
| 2010/0067059 | A1 * | 3/2010 | Sivan et al. .................. 358/3.06 |

* cited by examiner

*Primary Examiner* — Charlotte M Baker
(74) *Attorney, Agent, or Firm* — Fay Sharpe LLP

(57) ABSTRACT

A marking device is controlled to mark a media sheet with halftone dots selected from a set of image halftone dot representations. The marking device is controlled to mark a monitored surface with halftone dots selected from a set of control halftone dot representations to form test patches of different nominal marking densities. Measured marking densities are acquired using a density sensor for the test patches marked on the monitored surface. The set of control halftone dot representations is updated based on the measured marking densities and the nominal marking densities.

24 Claims, 3 Drawing Sheets

TONE REPRODUCTION CURVE LINEARIZATION

BACKGROUND

The following relates to the printing arts, reproduction arts, marking device arts, display arts, electrostatic reproduction arts, electrophotographic arts, and related arts. Some illustrative applications of the following include document printing, document photocopying, facsimile printing, and so forth.

Marking devices provide native or machine resolution corresponding to the physical dots or pixels of toner, ink, or other marking material that are marked on a sheet of paper or other media sheet. The marking densities, or the amount of marking material in each physical dot, or similar marking characteristics are impacted by various physical parameters of the marking process. The controls that determine these physical parameters are sometimes referred to as actuators. For electrostatic marking devices, the raster output scanning (ROS) power (e.g., optical power for a scanning laser diode, light emitting diode, or laser diode array), the development field ($V_{em}$), and the cleaning field ($V_{mc}$) are three parameters that may impact characteristics of the dots or densities marked on media sheets by the marking device.

In halftone marking, a binary "on/off" paradigm is employed for marking pixels. Relatively darker regions have a relatively higher density of marked pixels as compared to lighter regions. In one approach, the pixels of the marked area are delineated into halftone cells, which are also sometimes referred to as "halftone dots". Each pixel of a halftone cell or dot is assigned a threshold level. Whether a given pixel is "on" or "off" is determined by comparing the threshold level of that halftone pixel with a density level intended for that pixel. The thresholds are selected such that, for a uniform density level across the halftone dot, the fraction of "on" pixels is visually perceived as an average density corresponding to the desired uniform density level. A halftone dot represented by pixel thresholds is referred to as a halftone screen.

The fraction of pixels that are on determines the effective or average density. The distribution of the those pixels within the halftone dot (or, correspondingly, the distribution of thresholds within the halftone screen) can impact the image quality. The thresholds are preferably distributed in the halftone dot so as to minimize banding, moiré patterns, and so forth. Certain spatial threshold patterns, known as "quiet" halftones, are known to facilitate the interpolative modeling of density changes that occur between adjacent quiet halftone levels. The halftone technique is also readily extended to color marking by providing interleaved halftone pixels for cyan, magenta, yellow, and black or for another color blending scheme.

The target or nominal density curve is suitably represented by an array of values, in units appropriate to the sensor, with a discrete value for each printable level. A typical printing system might have 256 (8-bit) or 1024 (10-bit) distinct printable density levels. The thresholds of the halftone screen are selected such that, ideally, a density level represented by a value in the range 0-255 (assuming 8-bit representation), when mapped as a uniform density to halftone and marked by the marking device, appears visually to be at the nominal density value. The relationship between the actual densities provided by the marked halftone dots for uniform patches of the printable density levels is sometimes referred to as the tone reproduction curve (TRC). Ideally, the TRC should be linear with a slope of unity. This gives the minimum step size between any two adjacent levels, resulting in a smooth visual response. This ideal response has also been incorporated in existing standards for offset printing of digital images which are used in customer image processing applications.

In practice, the TRC may vary from this ideal, and may differ from marking device to marking device. The TRC may also drift over time due to changes in humidity, temperature, component wear, replacement of consumable components, toner refill, or so forth. Such drift can cause perceptible, and objectionable color errors in the case of color marking devices.

It is known to adjust the marking device to accommodate machine-specific behavior, and to compensate for drift over time. In one approach, the voltages $V_{em}$ and $V_{mc}$ are monitored electrically, e.g. using voltage sensors, and the corresponding actuators are controlled in a closed-loop fashion to maintain these voltages at selected setpoint levels. This approach can ensure good stability, but employs an indirect measure of the TRC and hence may fail to accurately compensate for drift in the TRC.

Another known approach is to measure the actually marked density. For electrostatic printing, this can be done using a density sensor monitoring the toner coverage on the photoreceptor for example using a sensor known as an enhanced toner area coverage (ETAC) sensor, or using a density sensor monitoring the density on the actual paper or other target sheet for example using an inline spectrophotometer (ILS) sensor. Measuring at the photosensor does not consume media sheets and can be performed rapidly on portions of the photoreceptor available during time intervals between processing of sheets. However, toner coverage at the photosensor may not correlate precisely with the actual density marked on the media sheet. Measurements on the media sheet are more accurate, but are slower and consume media sheets.

In one known adjustment process, voltage monitoring is performed on a substantially continuous basis in order to maintain the voltages $V_{em}$ and $V_{mc}$ at constant levels. This combats some sources of short-term TRC drift. On an occasional basis, e.g. every few thousand sheets or so, ETAC or ILS measurements are performed, and operational parameters such as ROS power and the setpoints for voltages $V_{em}$ and $V_{mc}$ are adjusted. Additionally, in some known approaches the selection of image halftone dots (or, equivalently, the threshold levels of the halftone screen) is also adjusted based on density measurements. These operational parameter adjustments combat TRC drift over time.

The test patches are formed at the various nominal density levels using a standard set of control halftone dots, which ensures fair comparison between density measurements taken at different times. Each control halftone dot is expected to produce a certain predetermined density level on the photosensor or media sheet. Any measured deviation from this predetermined density level from one measurement time to the next indicates a drift or error in the actual TRC exhibited by the installed marking device.

As an added benefit, if the standard set of control halftone dots is predetermined by the marking device manufacturer and installed on every installation of a given marking device model, then the standard set of control halftone dots provide an installation-independent standard for comparison. This enables the performance of a specific installed marking machine to be compared not just with its own performance over time, but also with the performance of other installed marking machines of the same model. This may facilitate diagnosis of a problem with an installed marking device of a standard model.

BRIEF DESCRIPTION

In some illustrative embodiments disclosed as illustrative examples herein, a marking device is disclosed, comprising:

a marking device configured to form markings on a media sheet; a readable and writable storage storing a set of control halftone dot representations; at least one density sensor configured to measure a density of markings generated by the marking device; and a processor configured to update the set of control halftone dot representations in the readable and writable storage based on measurements by the at least one density sensor of markings made by the marking device using halftone dots selected from the set of control halftone dot representations.

In some illustrative embodiments disclosed as illustrative examples herein, a marking method is disclosed, comprising: controlling a marking device to mark a media sheet with halftone dots selected from a set of image halftone dot representations; controlling the marking device to mark a monitored surface with halftone dots selected from a set of control halftone dot representations to form test patches of different nominal marking densities; acquiring measured marking densities for the test patches marked on the monitored surface using a density sensor; and updating the set of control halftone dot representations based on the measured marking densities and the nominal marking densities.

In some illustrative embodiments disclosed as illustrative examples herein, a marking method is disclosed, comprising: controlling a marking device to mark media sheets with halftone dots selected from a set of image halftone dot representations; first updating at least one of (i) operational parameters of the marking device and (ii) the set of image halftone dot representations; and second updating a set of control halftone dot representations based on density measurements of test patches formed by the marking device comprising halftone dots selected from the set of control halftone dot representations.

DETAILED DESCRIPTION

Figure 1:
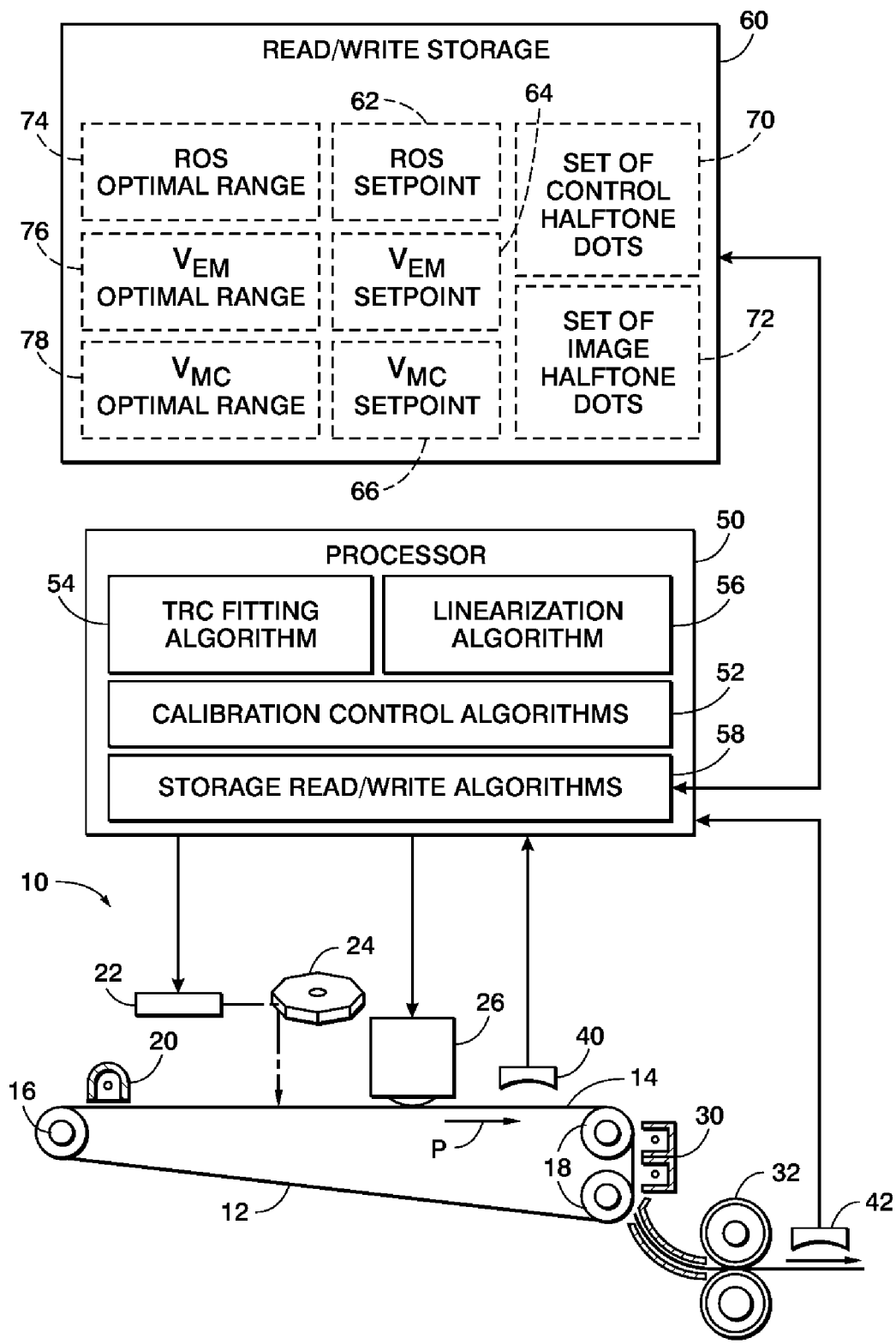
FIG. 1 diagrammatically shows an illustrative electrostatic marking device and associated control processor and read/write storage.

The use of a standard set of control halftone dots (optionally represented as a standard control halftone screen) has certain advantages. It enables straightforward detection of TRC error or drift, unlike methods which detect voltage changes, and infer TRC drift from them. It is typical to measure a set of control halftone dots spanning the TRC so as to characterize the entire TRC. If the standard set of control halftone dots is standardized across an entire marking device model line, then it also facilitates cross-installation comparisons amongst different installations of the same marking device model.

However, the inventors herein have recognized some unexpected and substantial disadvantages to employing a predetermined standard set of control halftone dots. Some such disadvantages relate to correction of TRC drift. If this drift is compensated by adjustment of operational parameters such as ROS power and the voltages $V_{em}$ and $V_{mc}$, the correction applies equally to both control and image dots. However, the range of parameter values required to correct for drift in the control TRC may give rise to other objectionable image quality defects, such as line width variation, background toner development or non-uniform prints. Additionally, the available operational parameters may be limited in their range, for example limited by the capabilities of the power supplies, and may not be able to correct completely for TRC drift on some machines. (See for an example FIG. 3 herein, where the filled diamond markers illustrate data points for which the control system has attempted to correct for TRC drift over a wide range of machine conditions by adjusting only the operational parameters).

To counteract this, it is known to fix operational parameters during a setup routine, and control the TRC by adjusting the set of image halftone dots used for printing. However, if the standard set of control halftone dots is not similarly adjusted, the test patches marked using these control halftone dots may be less than optimal for performing density measurements and TRC corrections. For example, the densities of the test patches may be nonuniform across the TRC curve, so that the TRC curve is not well characterized by the test patches.

In view of this, the inventors concluded that both the test patches and customer images should be marked using optimal, or close to optimal, values for the operational parameters, at fixed target densities which well-characterize the TRC. Correction of the TRC can then be performed by limited adjustment of the optimal or near-optimal operational parameter values coupled with adjustment of the image halftone dots (optionally represented by an image halftone screen). This results in relatively more of the TRC adjustment being provided by image halftone dot adjustment, and relatively less of the TRC adjustment being provided by adjustment of the operational parameter values. Over time, this approach results in the operational parameters tending to stay near or in the optimal operating space, and consequent marking device performance enhancement is expected.

To enable printing the test patches using optimal, or close to optimal, values for the operational parameters, it is disclosed herein to employ a marking device-specific set of control halftone dots (optionally represented by a marking device-specific control halftone screen). This marking device-specific set of control halftone dots is suitably obtained starting from a standard set of control halftone dots, for example provided by the marking device manufacturer, but the control halftone dots (or, equivalently, thresholds of a control halftone screen that represents the set of control halftone dots) are occasionally adjusted at the installed marking device on the basis of density measurements performed at the photoreceptor, on media sheets, or both, such that the set of control halftone dots for a specific marking device installation always provide substantially uniform linear coverage of the TRC when marked using that marking device with optimal or near-optimal values for the operational parameters.

With reference to FIG. 1, an electrostatic marking device 10 is illustrated diagrammatically, and includes an illustrated photoreceptor belt 12 (alternatively, a photoreceptor drum or other photoreceptor configuration can be used) having a charge-retentive surface 14. The illustrated photoreceptor belt 12 is moved in a process direction (denoted by arrow P in FIG. 1) by rollers 16, 18 (in the case of a photoreceptor drum, similar process direction movement can be obtained by rotating the drum about a drum axis). Moving from left to right in FIG. 1, principal components for forming an electrostatic latent image corresponding to a desired image or representation to be printed include an ion-generating structure 20, sometimes referred to as a "scorotron", which when operational imparts a substantially uniform electrical charge to the portion of the charge-retentive surface 14 of the photoreceptor belt 12 passing by the ion-generating structure 20. In some embodiments, the ion-generating structure 20 comprises a wire, or set of wires, configured to generate a corona discharge that imparts electrical charge to the charge-retentive surface 14.

The charge-retentive surface 14 with the imparted substantially uniform electrical charge then passes across an optical assembly 22, 24 comprising a laser diode, light emitting diode (LED), laser diode array, or other light source or array of light sources 22 and an illustrated rotatable mirror 24 or other optional optical component or components. In the illustrated embodiment, the rotatable mirror 24 provides scanning of the light beam in the cross-process direction (that is, the direction on the charge-retentive surface 14 oriented transverse to the process direction P). More generally, scanning or spanning of the charge-retentive surface 14 by the optical assembly 22, 24 in the cross-process direction coupled with movement of the charge-retentive surface 14 in the process direction P cooperatively enables a light beam or array of light beams to selectively discharge regions of the charge-retentive surface 14 so as to form an electrostatic latent image on the charge-retentive surface 14. For halftone imaging, the beam or beams are modulated "on" or "off" to selectively discharge regions of the charge-retentive surface 14 corresponding to physical pixels so as to form a halftone pattern defining the electrostatic latent image.

The electrostatic latent image on the charge-retentive surface 14 then passes across a developer unit 26 due to the continuing motion of the photoreceptor 12 in the process direction P. The developer unit 26 applies toner to the charge-retentive surface 14. The developed image is advanced along the process direction P to a transfer station 30 where pressure and/or electrical bias causes toner adhering to the charge-retentive surface 14 of the photoreceptor 12 to be transferred to a media sheet (not shown) such as a sheet of paper, a transparency slide, or so forth. The media sheet is moved through the transfer station 30 in parallel with the movement of the charge-retentive surface 14 in the process direction P so that the developed image is transferred from the charge-retentive surface 14 to the media sheet. The media sheet with the transferred image then passes through a fuser 32, which causes the toner to melt or fuse into the media sheet to create a final image on the media sheet.

The electrostatic marking device 10 also includes one or more monitoring devices. The illustrated marking device 10 includes an enhanced toner area coverage (ETAC) sensor 40 arranged to monitor marking density in the form of toner coverage on the charge-retentive surface 14 after the developed image leaves the developer unit 26. The illustrated marking device 10 also includes an inline spectrophotometer (ILS) sensor 42 arranged to monitor marking density in the form of transferred and fused toner on the media sheet after the media sheet leaves the fuser 32. The ETAC and ILS sensors 40, 42 have sensing areas substantially larger than the halftone dot size so that the average density represented by the halftone dots is measured.

Additionally, the electrostatic marking device 10 includes electrical sensors (not shown) to monitor voltages or other electrical signals of interest, such as the development field ($V_{em}$) and the cleaning field ($V_{mc}$). Still further, the optical assembly 20, 22 includes an optical power output indicative of the optical power of the light beam used to form the electrostatic latent image. This output is preferably the output of an optical sensor that measures the light intensity output by the optical device 20, optionally after processing by any optional optical components 22. For example, a partial mirror/photodiode combination (not shown) can be arranged to divert and measure a preselected portion (e.g., 1%) of the output light beam so as to measure the raster output scanning (ROS) power.

The illustrated electrostatic marking device 10 includes a single developer unit 26 and hence is capable of producing only a single density. Such an arrangement is suitable for a monotone marking device capable of producing regions of different grayscale images. For a color marking device, separate instances of at least the optical assembly 22, 24 and the developer unit 26 are suitably provided for each color of a color model (where "color" is to be broadly construed as also encompassing a black output), so as to generate color images by blending images of a suitable set of colors. For example, in some embodiments an instance of the optical assembly and developer unit are provided for each of the colors cyan, magenta, yellow, and black, so as to generate a color marking device implementing a subtractive CMYK color model. Optionally, separate instances of other components such as the transfer station 30 or fuser 32 may be provided for each color of the color model.

It is also contemplated to include various other components or features not illustrated in FIG. 1, such as one or more cleaning brushes to remove residual or excess toner from the charge-retentive surface 14 after the charge-retentive surface 14 passes through the transfer station 30, one or more additional ion-generating structures or charge removal structures to remove the electrostatic latent image after the charge-retentive surface 14 passes through the transfer station 30, additional components for aligning or registering electrostatic latent images for the different colors in the case of a color marking device, or so forth, a sheet feeding assembly for directing media sheets from a supply bin to the transfer station 30 and fuser 32 and from thence away into an output or collection bin, stapling station, or so forth.

The electrostatic marking device 10 is controlled by a processor 50 that coordinates and controls the various components 16, 18, 20, 22, 24, 26, 30, 32 in an open-loop fashion and/or on the basis of feedback provided by the various sensors including the ETAC and ILS sensors 40, 42. The processor 50 optionally performs various control and calibration functions such as registration of the various color images (in the case of a color marking device), monitoring and reporting toner usage, monitoring for and reporting media sheet jams, and so forth. The processor 50 receives a marking "job" in the form of, for example, an electronic document to be printed, and may optionally perform data processing on the received electronic document to convert it to a format suitable for use in controlling the marking device 10 to form images. This may entail converting a document in a page description language (PDL) from one format to another, retrieving pre-generated images, performing raster image processing (RIP) to convert the document into a pixel map that is applied to the thresholds of a halftone screen to define halftone pixels to be marked on a media sheet, or so forth. In some embodiments the electrostatic marking device 10 may be a component of a multifunctional device including capabilities such as printing, photocopying, facsimile transmission and receipt, and so forth, in which case the processor 50 may be programmed to perform operations relating to these functions such as optical scanning using an optical scanning bed (not shown), telephonically receiving a facsimile transmission, or so forth. Such operations may result in marking "jobs" for the marking device 10, such as printout of a photocopy, printout of a received facsimile transmission, or so forth.

Additionally, the processor 50 is programmed to perform operations relating to maintaining color consistency (in the case of a color marking device) or density uniformity, and accordingly performs density maintenance operations. Toward that end, the processor 50 is programmed or otherwise configured to implement calibration control algorithms 52 that modify parameters and the sets of control and (optionally) image halftone dots to accommodate drift in the TRC, to correct for errors in the TRC, or so forth so as to maintain color consistency (in the case of a color marking device) or density uniformity. The calibration control algorithms 52 make use of a TRC fitting algorithm 54 to estimate the TRC based on information derived from measurements by the ETAC or ILS sensor 40, 42 of a discrete number of test patches of different densities, and a linearization algorithm 56 configured to select a set of halftone dots (optionally represented as a halftone screen or otherwise represented) to smoothly span the density range of interest. The processor 50 is further programmed or otherwise configured to implement storage read/write algorithms 58 that read calibration data from a read/write storage 60 and write updated calibration data to the read/write storage 60. In the illustrated embodiment relating to the electrostatic marking device 10, the read/write storage 60 stores calibration parameters including: a ROS power setpoint 62; a development field ($V_{em}$) setpoint 64; and the cleaning field ($V_{mc}$) set point 66; a set of control halftone dot representations 70 that are used in marking the test patches; a set of image halftone dots 72 that are used in marking images of documents, facsimiles, photocopies, or other content of interest to users; an optimal range for values of the ROS power 74; an optimal range for values of the development field ($V_{em}$) 76; and an optimal range for values of the cleaning field ($V_{mc}$) 78.

The set of image halftone dots 72 may comprise one, two, three, or more sets of image halftone dots. For example, there may be different sets of image halftone dots for different halftone screen frequencies, different color palettes, or so forth. Each set of image halftone dots 72 may optionally be stored as a halftone screen.

The set of control halftone dot representations 70 is stored in the readable and writable storage 60, which enables the set of control halftone dots 70 to be updated occasionally by writing an updated set of control halftone dots 70. The set of control halftone dots 70 is optionally stored as a halftone screen. Alternatively, since the set of control halftone dots 70 is used for printing regions of uniform density, it is contemplated to store the set of halftone dots 70 as filled in halftone dots for specific (uniform) density levels. For example, given a (uniform) density level of value 100, one can pre-compute and store the halftone dot in which the pixels are assigned values based on comparisons of the pixel thresholds of the control halftone screen and the (uniform) density level of (in this illustrative instance) value 100. It is also contemplated to store the set of control halftone dots 70 and/or the set of image halftone dots 72 using other representations, such as storing a TRC in conjunction with a halftone screen in which the thresholds are represented as functions of the stored TRC.

Figure 2:
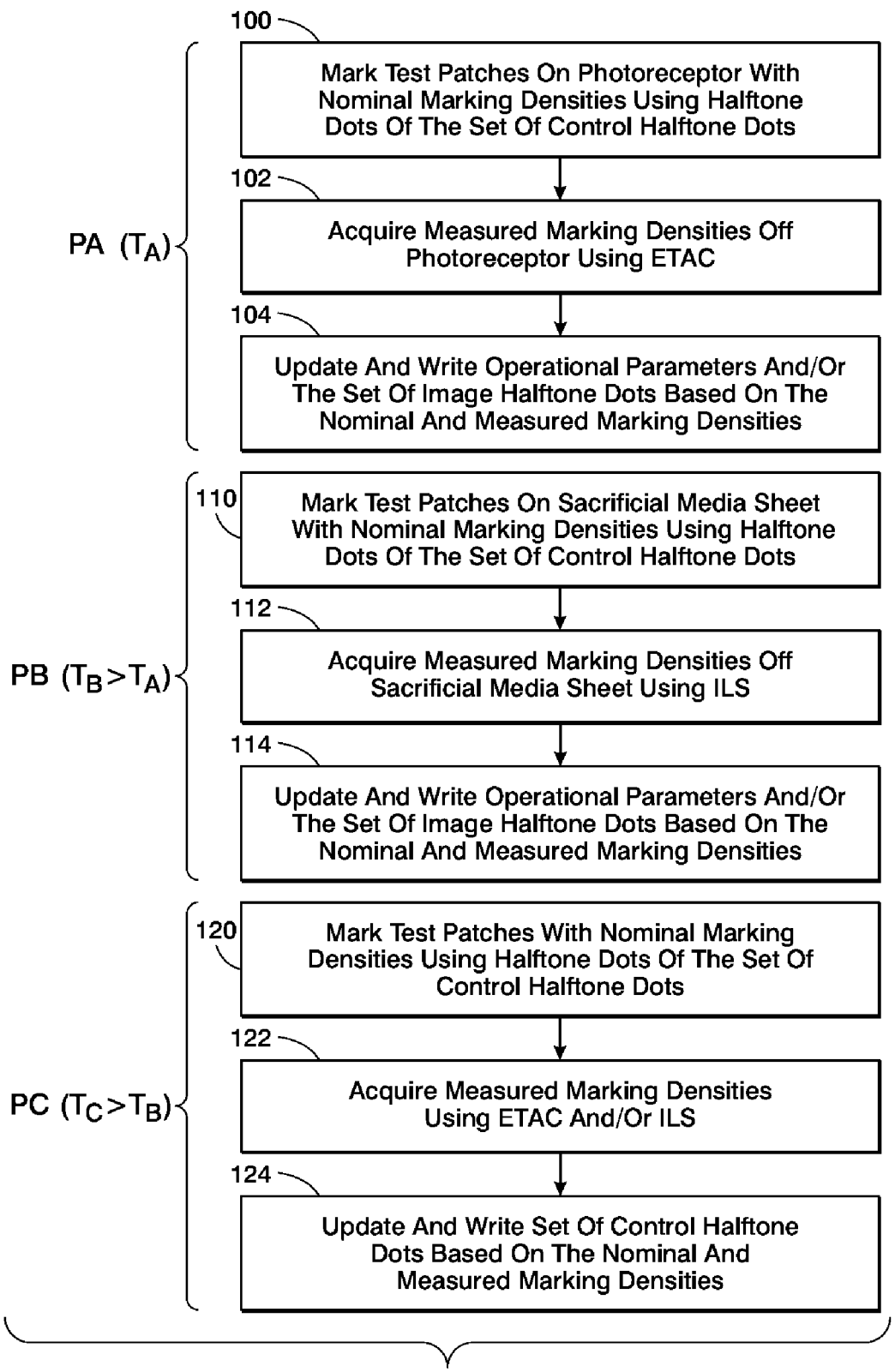
FIG. 2 diagrammatically flowcharts various calibration processes suitably executed by the processor of FIG. 1 to calibrate the density consistency of the marking device of FIG. 1.

With continuing reference to FIG. 1 and with further reference to FIG. 2, a suitable TRC calibration and linearization procedure is described. The calibration is performed at three levels of increasing complexity, and in some embodiments the three levels are performed with decreasing repetition frequency.

A calibration process PA is performed most frequently, for example after each media sheet is marked or after a small number of media sheets (e.g., every ten or every 50 media sheets) is marked. The calibration process PA includes: a marking operation 100 in which test patches of different nominal densities are marked on the charge-retentive surface 14 of the photoreceptor 12 (or, more generally, on some intermediate surface of the marking device 10) using halftone dots selected from the set of control halftone dots 70; an acquisition operation 102 in which the ETAC sensor 40 is used to measure marking densities for the test patches; and an update-and-write operation 104 in which operational parameters (such as the setpoint values 62, 64, 66 for ROS power, $V_{em}$, and $V_{mc}$, respectively) are updated based on the measured and nominal marking densities. It is also contemplated to update the set of image halftone dots 72 as part of the update-and-write operation 104; however, the image halftone dots 72 are generally preferred to be updated based on ILS measurements at the media sheet (see calibration process PB described next). In some embodiments, the calibration process PA is performed rather frequently, at intervals denoted $T_A$. The calibration process PA is effective at detecting and correcting for shifts in the processing parameters (e.g., ROS power, $V_{em}$, $V_{mc}$), but may fail to detect and correct TRC errors introduced by components such as the transfer unit 30 and/or the fuser 32 that are downstream from the developer unit 26.

A second calibration level, denoted as calibration process PB, is in some embodiments performed at intervals $T_B$ that are generally less frequent than the intervals $T_A$ at which the calibration process PA is performed. For example, if the process PA is performed after processing every few media sheets, the process PB may be performed after each marking job is completed, or may be performed once per day, or so forth. The calibration process PB includes: a marking operation 110 in which test patches of different nominal densities are marked on a sacrificial media sheet (or a sacrificial media sheet portion, such as a margin that is later trimmed off) using halftone dots selected from the set of control halftone dots 70; an acquisition operation 112 in which the ILS sensor 42 is used to measure marking densities for the test patches; and an update-and-write operation 114 in which the set of image halftone dots 72 are updated based on the measured and nominal marking densities. It is also contemplated to update the operational parameters (such as the setpoint values 62, 64, 66 for ROS power, $V_{em}$, and $V_{mc}$, respectively) as part of the calibration process PB, either in place of or in addition to the occasional running of the ETAC-based calibration process PA. The calibration process PB is slower than the calibration process PA, and it consumes one or more sacrificial media sheets or sheet portions. However, because the process PB measures marking densities on the sacrificial media sheet or sheet portion, it is able to detect and correct TRC errors introduced by components such as the transfer unit 30 or the fuser 32 that are downstream from the developer unit 26.

A third calibration level, denoted as calibration process PC, includes: a marking operation 120 in which test patches of different nominal densities are marked on the charge-retentive surface 14 of the photoreceptor 12 (or, more generally, on some intermediate surface of the marking device 10) or on a sacrificial media sheet or sheet portion, the marking operation 120 using halftone dots selected from the set of control halftone dots 70; an acquisition operation 122 in which the ETAC or ILS sensor 40, 42 is used to measure marking densities for the test patches; and an update-and-write operation 124 in which the set of control halftone dots 70 is updated based on the measured and nominal marking densities. The calibration process PC is in some embodiments performed at intervals $T_C$ that are generally less frequent than the intervals $T_B$ at which the calibration process PB is performed. For example, the process PB may be performed once a day, or after each run job is completed, or so forth; whereas the calibration process PC is performed on a monthly basis, or after any repair, modification, or substantial maintenance operation performed on the marking device 10, or so forth. In some embodiments, the calibration process PC is always followed by running calibration process PB so as to calibrate the set of image halftone dots 72 to comport with the updated control halftone dots generated by running the process PC.

In general, it is to be appreciated that the time intervals $T_A$, $T_B$, $T_C$ are not necessarily fixed intervals. For example, the calibration process PC may be performed after any repair, modification, or substantial maintenance operation performed on the marking device 10, such operations being performed on a non-periodic schedule, for example whenever a consumable part fails or whenever the marking device 10 fails. Moreover, in a system which includes the ETAC sensor 40 but not the ILS sensor 42, the calibration process PB is suitably omitted and the process PA is used to calibrate both the operational parameters and the set of image halftone dots, and the process PC utilizes the ETAC sensor. Similarly, in a system which includes the ILS sensor 42 but not the ETAC sensor 40, the calibration process PA is suitably omitted and the process PB is used to calibrate both the operational parameters and the set of image halftone dots, and the process PC utilizes the ILS sensor.

Each of the process operations 100, 110, 120 entail marking test patches comprising halftone dots selected from the set of control halftone dots 70. The three process operations 100, 110, 120 optionally employ the same marking algorithm. The process PC is primarily intended to calibrate the set of control halftone dots 70, and in view of this the marking operation 120 is optionally performed with some set of operational parameters each lying within an optimal range. For example, the process operation 120 may be suitably performed with the ROS power in the ROS optimal range 74, and with $V_{mc}$ in the $V_{mc}$ optimal range 78. These optimal ranges 74, 78 are suitably selected based on calibration runs, or based on the manufacturer's recommended optimal ranges for these operational parameters. In some contemplated embodiments, the process operation 120 may be suitably performed with the operational parameters ROS power and $V_{mc}$ at fixed optimal values within the optimal ranges 74, 78. Other operational parameters optionally may vary during this process. For example, $V_{em}$ 76 may vary from its optimal value in order to maintain the solid area density point for the TRC.

The set of control halftone dot representations 70 is suitably initialized upon installation of the marking device or device 10 with manufacturer's recommended values. These recommended values are expected to give good results when the marking device conforms closely with manufacturer specifications and when all consumable parts are close to the nominal values. However, each time the calibration process PC is run, the set of control halftone dot representations 70 stored in the readable and writable storage 60 is updated, and so over time the set of control halftone dots 70 is expected to differ from the manufacturer's recommended values.

If the set of control halftone dot representations 70 are stored as filled in halftone dots for specific (uniform) density levels, then updating the set of control halftone dots 70 entails updating the "on" and "off" values of the filled in pixels of the halftone dot corresponding to each (uniform) density level. On the other hand, if the set of control halftone dot representations 70 is stored as a control halftone screen, then the adjustment suitably entails adjusting thresholds of the control halftone screen which consequently produces adjustments in the set of control halftone dots generated by comparing selected (uniform) density values to the thresholds of the control halftone screen. Other storage representations are also contemplated, such as storing a (optionally read-only) control halftone screen in which the thresholds are functionally dependent upon a TRC function, in which case the updating entails updating the TRC function.

Each of the acquisition operations 102, 112, 122 optionally employ the same acquisition algorithm, except for modifications to accommodate the choice of sensor. The acquisition operations 102, 112 differ in that the acquisition operation 102 employs the ETAC sensor 40 while the acquisition operation 112 employs the ILS sensor 42. The acquisition operation 122 can employ either or both sensors 40, 42. In some embodiments the test or control patches of process PC are read by the ETAC in operation 122, which minimizes differences caused by components such as the transfer unit 30 or the fuser 32 that are downstream from the ETAC sensor 40.

The updating of the set of control halftone dot representations 70, or the set of image halftone dot representations 72, entails applying the TRC fitting algorithm 54 to estimate the TRC from the measured and nominal marking densities, and applying the linearization algorithm 56 to linearize the set of control halftone dots 70 (in the case of operation 124) or the set of image halftone dots 72 (in the case of operation 114) respective to the computed tone reproduction curve. The TRC fitting algorithm 54 can employ any suitable curve-fitting or interpolation algorithm, such as fitting to constituent analytical functions such as polynomials or spline functions. Linearization then entails selection, based on the fitted TRC, of a set of halftone dots (or, equivalently, selection of thresholds of a halftone screen) such that mapping of a given (uniform) nominal density level to the halftone screen or selection of the halftone dot corresponding to the nominal density level produces a marked density level that measured by the sensor to be equivalent to the nominal density level.

In one suitable approach, the fitted TRC is used to determine the fraction of "on" pixels that are needed to provide a given nominal density level, and then pixels of the halftone cell are turned "on" in a predetermined fill order until the determined fraction of "on" pixels is reached. This approach is of particular advantage in the case of adjusting the set of control halftone dots 70, which are used only for mapping uniform density levels to halftone. In another suitable approach, the fitted TRC is used to determine the fraction of "on" pixels that are needed to provide a given nominal density level, and then thresholds of a halftone screen are assigned in accordance with a predetermined formula such that the determined fraction of "on" pixels is obtained when the (uniform) nominal density is mapped using the halftone screen.

The calibration processes PA, PB, PC are synergistic and provide different mechanisms for cooperatively keeping the marking device well-calibrated to provide good color consistency (for color marking devices) or good density consistency. The processes PA, PB are used to adjust the operational parameters (e.g., ROS power, $V_{em}$, $V_{mc}$, or so forth), and the set of image halftone dots 72, so as to maintain color or density consistency. However, repeated application of these processes PA, PB can result in the setpoints 62, 64, 66 for the operational parameters drifting substantially away from the optimal ranges 74, 76, 78 for these parameters. This is counteracted by occasionally running the calibration process PC, preferably with the operational parameters adjusted to values satisfying the optimal ranges 74, 78, so as to adjust the set of control halftone dots 70 to provide smooth coverage of the actual TRC of the marking device 10 in its current operating condition. Thereafter, repeating the processes PA, PB will typically result in adjusted operational parameter setpoints 62, 64, 66 that are within or at least close to the respective the optimal ranges 74, 76, 78. The calibration process PC generally does not need to be run very frequently—only often enough to counteract the slow drift of the operational parameter setpoints 62, 64, 66 caused by the more frequently run processes PA, PB.

Moreover, it is to be appreciated that either one of the calibration processes PA, PB is optionally omitted. In other words, it is sufficient to include only one of the processes PA, PB. However, including both processes PA, PB advantageously provides frequent approximate updating of the color or density consistency via measurements on the photoreceptor 12 (process PA) coupled with less frequent but more accurate updating of the color or density consistency via measurements on media sheets (process PB).

Figure 3:
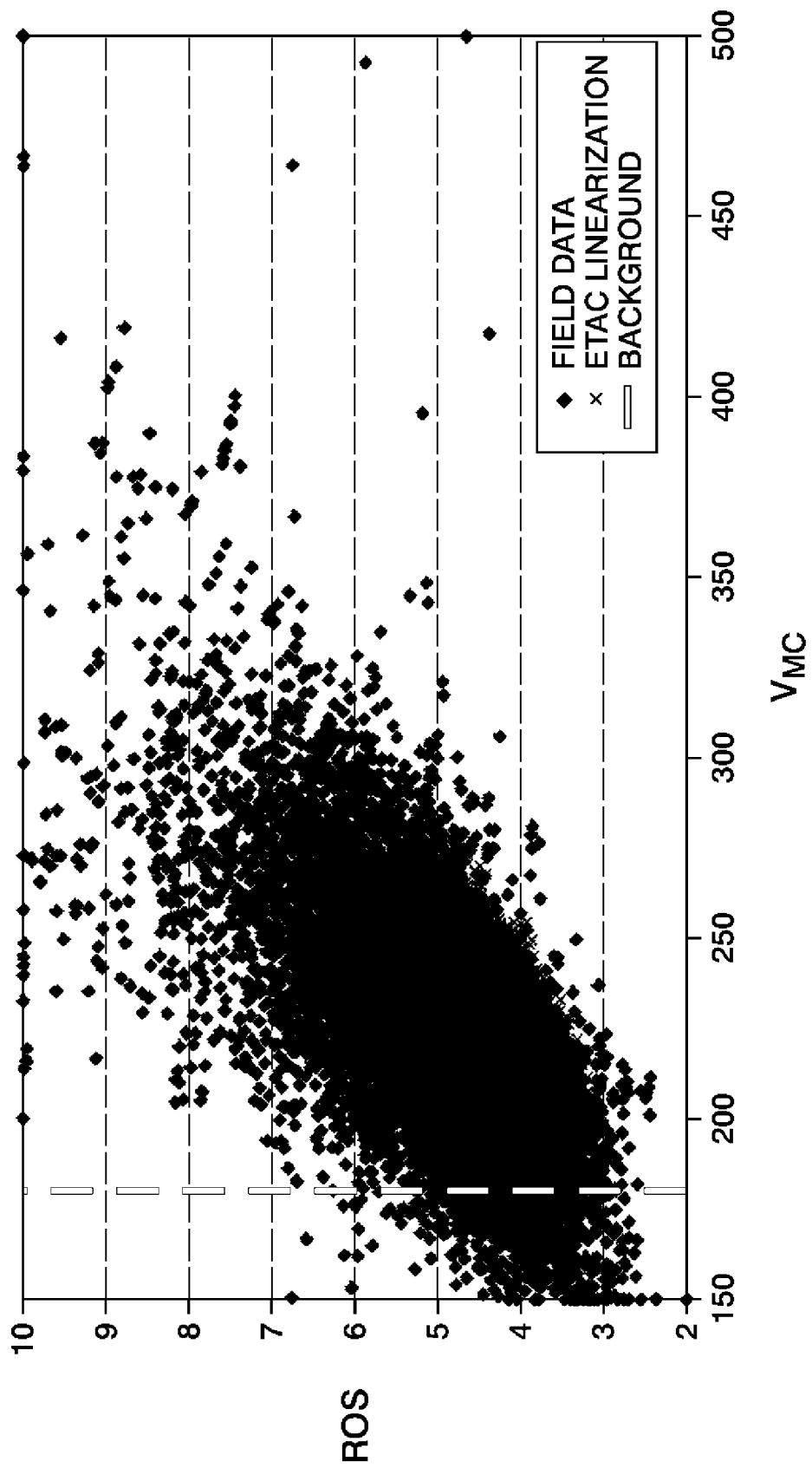
FIG. 3 shows a scatter plot of operational parameter setpoints in the presence and absence of control dot adjustment, in which the abscissa is the cleaning field ($V_{mc}$) setpoint and the ordinate is the raster output scanning (ROS) power setpoint

With reference to FIG. 3, the impact of performing the calibration process PC on drift of the ROS power and cleaning field $V_{mc}$ is illustrated for a marking engine. FIG. 3 is a scatter plot in which the abscissa is the $V_{mc}$ setpoint 66 and the ordinate is the ROS power setpoint 62. The filled diamond data points represent setpoints for calibrations performed using only the calibration process PA but not the calibration processes PB, PC. The lighter "x"-shaped data points are superimposed on the filled diamond data points, and represent setpoints for calibrations performed using the processes PA, PC, but not the process PB. In other words, the difference between the filled diamond data points and the lighter "x"-shaped data points is inclusion of an occasional calibration run according to process PC. It is readily seen that the inclusion of the process PC substantially reduces the drift in both the ROS power setpoint 62 and the $V_{mc}$ setpoint 66.

The calibration processes PA, PB, PC are described with respect to the monotone marking device 10 of FIG. 1. In the case of a color marking device, these processes are suitably repeated for each color channel, e.g. for each of the cyan, magenta, yellow, and black channels in the case of a color marking device implementing a subtractive CMYK color model. The storage stores a set of control halftone dot representations for each color channel, and stores a set of image halftone dot representations for each color channel, as well as operational parameter setpoint values for each color channel and optional optimal range constraints for each color channel. The processes PA, PB, PC are run independently for each channel, with each channel's calibration processes employing test patches marked using the set of control halftone dots for that channel and updating the set of control halftone dot representations, or set of image halftone dot representations, or operational parameters, for that channel. The effect is to keep the operational parameters for each channel in or near the optimal range, so that each channel has well-controlled color characteristics which in turn leads to good color consistency with limited drift.

The illustrated embodiments relate to electrostatic marking devices. However, the techniques disclosed herein are more generally applicable to any type of marking device that employs halftone marking. In the case of an ink-based marking device, for example, the process parameters under control may include parameters controlling the size of applied ink droplets, rather than ROS power, development field ($V_{em}$) and the cleaning field ($V_{mc}$) as in the case of an electrostatic marking device. However, the techniques and advantages disclosed herein relating to occasional updating of the set of control halftone dots are applicable to such marking devices employing technologies other than electrostatic marking.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
   an electrostatic marking device configured to form markings on a media sheet;
   a readable and writable storage storing a set of control halftone dot representations;
   at least one density sensor configured to measure a density of markings generated by the electrostatic marking device; and
   a processor configured to update the set of control halftone dot representations in the readable and writable storage based on measurements by the at least one density sensor of markings made by the electrostatic marking device using halftone dots selected from the set of control halftone dot representations, the processor further configured to adjust at least one of (i) a raster output scanning power, (ii) a development field ($V_{em}$), and (iii) a cleaning field ($V_{mc}$) of the electrostatic marking device based on measurements by the at least one density sensor of markings made by the electrostatic marking device using halftone dots selected from the set of control halftone dot representations.

2. The apparatus as set forth in claim 1, wherein the processor is configured to update the set of control halftone dot representations by computing a tone reproduction curve and linearizing the set of control halftone dot representations respective to the computed tone reproduction curve.

3. An apparatus comprising:
   a marking device configured to form markings on a media sheet;
   a readable and writable storage storing a set of control halftone dot representations and a set of image halftone dot representations;
   at least one density sensor configured to measure a marking density generated by the marking device on a monitored surface selected from the group consisting of (i) a sacrificial media sheet or sheet portion and (ii) an intermediate surface of the marking device; and
   a processor configured to update the set of control halftone dot representations in the readable and writable storage based on measurements by the at least one density sensor of markings made by the marking device using halftone dots selected from the set of control halftone dot representations, the processor is configured to (i) control the marking device to mark a media sheet with halftone dots selected from the set of image halftone dot representations, (ii) control the marking device to mark the monitored surface with halftone dots selected from the set of control halftone dot representations to form test patches of different nominal marking densities, (iii) acquire measured marking densities for the test patches using the at least one density sensor, (iv) compute an updated set of control halftone dot representations based on the measured marking densities and the nominal marking densities, and (v) update the set of control halftone dot representations stored in the storage with the updated set of control halftone dot representations.

4. The apparatus as set forth in claim 3, wherein the processor is further configured to (vi) compute an updated set of image halftone dot representations and (vii) update the set of image halftone dot representations stored in the storage with the updated set of image halftone dot representations.

5. The apparatus as set forth in claim 4, wherein the processor is configured to compute and update (iv, v) the set of control halftone dot representations substantially less frequently than the processor is configured to compute and update (vi, vii) the set of image halftone dot representations.

6. The apparatus as set forth in claim 3, wherein the processor is further configured to adjust at least one operational parameter of the marking device based on measurements by the at least one density sensor of markings made by the marking device using halftone dots selected from the set of control halftone dot representations.

7. The apparatus as set forth in claim 3, wherein the set of control halftone dot representations is selected from a group of representations consisting of: (i) a control halftone screen and (ii) a set of filled in control halftone dots each corresponding to a nominal density level.

8. The apparatus as set forth in claim 3, wherein the marking device comprises an electrostatic marking device, and the processor is configured to perform the control operation (ii) with (I) a raster output scanning power set to a value satisfying a predetermined raster output scanning power optimal range and (II) a cleaning field ($V_{mc}$) set to a value satisfying a predetermined cleaning field optimal range.

9. The apparatus as set forth in claim 3, wherein the processor is configured to update the set of control halftone dot representations by computing a tone reproduction curve and linearizing the set of control halftone dot representations respective to the computed tone reproduction curve.

10. A marking method comprising:
controlling a marking device to mark media sheets with halftone dots selected from a set of image halftone dot representations;
first updating at least one of (i) operational parameters of the marking device and (ii) the set of image halftone dot representations, the first updating being based at least in part on measurement of one or more operational voltages of the marking device; and
second updating a set of control halftone dot representations based on density measurements of test patches formed by the marking device comprising halftone dots selected from the set of control halftone dot representations.

11. The marking method as set forth in claim 10, wherein the first updating is based at least in part on density measurements of test patches formed by the marking device comprising halftone dots selected from the set of control halftone dot representations.

12. A marking method comprising:
controlling a marking device to mark a media sheet with halftone dots selected from a set of image halftone dot representations;
controlling the marking device to mark a monitored surface with halftone dots selected from a set of control halftone dot representations to form test patches of different nominal marking densities, wherein the monitored surface is selected from the group consisting of (i) a sacrificial media sheet or sheet portion and (ii) an intermediate surface of the marking device;
acquiring measured marking densities for the test patches marked on the monitored surface using a density sensor; and
updating the set of control halftone dot representations based on the measured marking densities and the nominal marking densities.

13. The marking method as set forth in claim 12, wherein the updating comprises:
computing a tone reproduction curve based on the measured marking densities and the nominal marking densities; and
updating a linearization of the set of control halftone dot representations respective to the computed tone reproduction curve.

14. The marking method as set forth in claim 13, further comprising:
updating a linearization of the set of image halftone dot representations respective to the computed tone reproduction curve.

15. The marking method as set forth in claim 14, wherein the updating of the linearization of the set of control halftone dot representations is performed substantially less frequently than the updating of the linearization of the set of image halftone dot representations.

16. The marking method as set forth in claim 14, further comprising:
adjusting at least one operational parameter of the marking device based on the computed tone reproduction curve.

17. The marking method as set forth in claim 12, wherein the marking device comprises an electrostatic marking device, and the method further comprises:
adjusting at least one of (i) a raster output scanning power, (ii) a development field ($V_{em}$), and (iii) a cleaning field ($V_{mc}$) of the electrostatic marking device based on the measured marking densities and the nominal marking densities.

18. An apparatus comprising:
an electrostatic marking device configured to form markings on a media sheet;
a readable and writable storage storing a set of control halftone dot representations;
at least one density sensor configured to measure a density of markings generated by the electrostatic marking device, the at least one density sensor comprising one or more density sensors selected from the group consisting of (i) a toner area coverage sensor configured to measure marking density on a photoreceptor of the electrostatic marking device, and (ii) an optical sensor configured to measure marking density on a sacrificial media sheet or sheet portion; and
a processor configured to update the set of control halftone dot representations in the readable and writable storage based on measurements by the at least one density sensor of markings made by the electrostatic marking device using halftone dots selected from the set of control halftone dot representations.

19. The apparatus as set forth in claim 18, wherein the processor is configured to update the set of control halftone dot representations by computing a tone reproduction curve and linearizing the set of control halftone dot representations respective to the computed tone reproduction curve.

20. A marking method comprising:
controlling a marking device to mark media sheets with halftone dots selected from a set of image halftone dot representations;
first updating at least one of (i) operational parameters of the marking device and (ii) the set of image halftone dot representations; and
second updating a set of control halftone dot representations based on density measurements of test patches formed by the marking device comprising halftone dots selected from the set of control halftone dot representations;
wherein the second updating is performed substantially less frequently than the first updating.

21. The marking method as set forth in claim 20, wherein the first updating is based at least in part on density measurements of test patches formed by the marking device comprising halftone dots selected from the set of control halftone dot representations.

22. The marking method as set forth in claim 20, wherein the second updating is performed at intervals corresponding to a repair, modification, or substantial maintenance operation performed on the marking device.

23. The marking method as set forth in claim 22, wherein the first updating is repeated at occasions selected from a group consisting of: (i) time intervals between the marking of successive media sheets by the controlling operation, and (ii) time intervals separated by the marking of a selected number of media sheets by the controlling operation.

24. The marking method as set forth in claim 20, wherein the second updating comprises:
    computing a tone reproduction curve based on the density measurements of the test patches; and
    linearizing the set of control halftone dot representations respective to the computed tone reproduction curve.

* * * * *